(12) United States Patent
Wang et al.

(10) Patent No.: US 11,270,478 B2
(45) Date of Patent: *Mar. 8, 2022

(54) SYSTEM AND METHOD FOR RECONSTRUCTING A COMPUTED TOMOGRAPHY IMAGE

(71) Applicant: SHANGHAI UNITED IMAGING HEALTHCARE CO., LTD., Shanghai (CN)

(72) Inventors: Xin Wang, Shanghai (CN); Guotao Quan, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 173 days.

This patent is subject to a terminal disclaimer.

(21) Appl. No.: 16/517,775

(22) Filed: Jul. 22, 2019

(65) Prior Publication Data

US 2019/0371016 A1    Dec. 5, 2019

Related U.S. Application Data

(63) Continuation of application No. 15/638,360, filed on Jun. 29, 2017, now Pat. No. 10,360,698, which is a (Continued)

(30) Foreign Application Priority Data

Dec. 28, 2015 (CN) .......................... 201511000920.4

(51) Int. Cl.
*G06T 11/00* (2006.01)
*G06T 3/40* (2006.01)

(52) U.S. Cl.
CPC .......... *G06T 11/005* (2013.01); *G06T 11/006* (2013.01); *G06T 3/40* (2013.01); *G06T 2210/41* (2013.01); *G06T 2211/412* (2013.01)

(58) Field of Classification Search
None
See application file for complete search history.

(56) References Cited

U.S. PATENT DOCUMENTS 6,307,909 B1    10/2001    Flohr et al.
6,762,760 B2    7/2004    Deering
(Continued)

FOREIGN PATENT DOCUMENTS

| CN | 1689520 A | 11/2005 | |
|---|---|---|---|
| CN | 101772324 A | * 7/2010 | ............. A61B 6/482 |
| CN | 104851076 A | 8/2015 | |

OTHER PUBLICATIONS

Schafer, Dirk, et al. "Motion-compensated and gated cone beam filtered back-projection for 3-D rotational X-ray angiography." IEEE transactions on medical imaging 25.7 (2006): 898-906. (Year: 2006).*

(Continued)

*Primary Examiner* — Michelle M Entezari
(74) *Attorney, Agent, or Firm* — Metis IP LLC

(57) ABSTRACT

A method for reconstructing an image may include obtaining scan data relating to a subject. The method may also include determining a first field of view (FOV) and determining a second FOV. The method may further include reconstructing a first image based on a first portion of the scan data corresponding to the first field of view, and reconstructing a second image based on a second portion of the scan data corresponding to the second field of view. The method may also include generating a third image based on the first image and the second image.

18 Claims, 12 Drawing Sheets

Related U.S. Application Data continuation of application No. PCT/CN2016/112444, filed on Dec. 27, 2016.

(56) References Cited

U.S. PATENT DOCUMENTS

| | | | |
|---|---|---|---|
| 6,856,666 | B2 | 2/2005 | Lonn et al. |
| 8,031,828 | B1 * | 10/2011 | DeMan ............... A61B 6/027 |
| | | | 378/4 |
| 8,801,186 | B2 * | 8/2014 | Frey ................. A61B 3/14 |
| | | | 351/221 |
| 9,569,846 | B2 | 2/2017 | Fletcher et al. |
| 10,178,300 | B2 | 1/2019 | Rivard et al. |
| 10,832,451 | B2 * | 11/2020 | Demesmaeker ...... G06T 11/006 |
| 2003/0031289 | A1 | 2/2003 | Hsieh |
| 2004/0066909 | A1 | 4/2004 | Lonn et al. |
| 2004/0066911 | A1 | 4/2004 | Hsieh et al. |
| 2004/0208277 | A1 | 10/2004 | Morikawa et al. |
| 2006/0004275 | A1 | 1/2006 | Vija et al. |
| 2008/0086052 | A1 | 4/2008 | Hsieh |
| 2010/0239146 | A1 | 9/2010 | Suzuki |
| 2012/0093281 | A1 | 4/2012 | Zamyatin et al. |
| 2014/0111767 | A1 * | 4/2014 | Murase ............... A61B 3/102 |
| | | | 351/206 |
| 2014/0197835 | A1 | 7/2014 | Kamada et al. |
| 2015/0243045 | A1 * | 8/2015 | Ra ..................... A61B 6/032 |
| | | | 382/131 |
| 2015/0289832 | A1 * | 10/2015 | Bal .................... A61B 6/032 |
| | | | 600/411 |
| 2016/0004917 | A1 | 1/2016 | Yoshida |
| 2016/0080653 | A1 | 3/2016 | Kim et al. |
| 2016/0161579 | A1 | 6/2016 | Van Den Brink |
| 2016/0206262 | A1 * | 7/2016 | Langan ............... A61B 6/0487 |

OTHER PUBLICATIONS

Chun, I. K., Lee, S. C., Cho, M. H., Cho, M. H., & Lee, S. Y. (Oct. 2004). Zoom-in micro tomography with the combination of full and limited field-of-view projection data. In IEEE Symposium Conference Record Nuclear Science 2004. (vol. 5, pp. 2962-2964). IEEE. (Year: 2004).*

Machine Translation of CN 101772324 A (Year: 2010).*

International Search Report in PCT/CN2016/112444 dated Apr. 7, 2017, 4 pages.

Written Opinion in PCT/CN2016/112444 dated Apr. 7, 2017, 4 pages.

R. Manzke et al., Adaptive Temporal Resolution Optimization in Helical Cardiac Cone Beam CT Reconstruction, Medical Physics, 30(12): 3072-3080, 2003.

First Office Action in Chinese Application No. 201511000920.4 dated Aug. 28, 2019, 18 pages.

* cited by examiner

SYSTEM AND METHOD FOR RECONSTRUCTING A COMPUTED TOMOGRAPHY IMAGE

CROSS-REFERENCE TO RELATED APPLICATIONS

This application is a continuation of U.S. application Ser. No. 15/638,360, filed on Jun. 29, 2017, which is a continuation of International Application No. PCT/CN2016/112444, filed on Dec. 27, 2016, which claims priority of Chinese Patent Application No. 201511000920.4 filed on Dec. 28, 2015, the entire contents of each of which are hereby incorporated by reference.

TECHNICAL FIELD

The present disclosure generally relates to imaging system, and more particularly, relates to a system and method for image reconstruction.

BACKGROUND

With the development of computer science and information technology, many imaging system such as computer tomography (CT) or digital radiography (DR) might be used for medical (e.g. medical CT), industrial (e.g. inspection of weld joints), research (e.g. archeology), or security applications (e.g. airport screening). For an imaging system, an image may be reconstructed in a field of view (FOV). Generally, for a movement subject such as the heart, the large FOV may lead to a lower quality of image, for example, a lower resolution, motion artifacts, etc. While, a small FOV may not meet the clinical demands. For example, the examination of chest pain triad may reconstruct an image of the heart in a large FOV. The large FOV may present the lung tissue around the heart in the image, but incur the heart arteries presented in the center of the image not clear.

Accordingly, it would be desirable to reconstruct an image with a high resolution in a large FOV.

SUMMARY

The present disclosure provided herein relates to image processing, and more particularly, to systems and methods for reconstructing an image. In an aspect of the present disclosure, a method for reconstructing an image is provided. The method may include obtaining scan data relating to a subject. The method may also include determining a first field of view (FOV) and a second FOV. The method may further include reconstructing a first image based on a first portion of the scan data corresponding to the first FOV, and reconstructing a second image based on a second portion of the scan data corresponding to the second FOV. The method may also include generating a third image based on the first image and the second image.

Another aspect of the present disclosure relates to a system for reconstructing an image. The system may include a data acquisition module configured to obtain scan data relating to a subject. The system may also include a FOV determination unit configured to determine a first FOV and a second FOV. The system may further include a weighting function determination unit configured to determine a first portion of the scan data corresponding to the first FOV and a second portion of the scan data corresponding to the second FOV. The system further include an image generation unit configured to reconstruct a first image based on the first portion of the scan data, a second image based on the second portion of the scan data, and a third image based on the first image and the second image.

According to another aspect of the present disclosure, a non-transitory computer readable medium embodying a computer program product is provided. The computer program product may include instructions that are configured to cause a computing device to obtain scan data relating to a subject, determine a first FOV and a second FOV. The computer program product may also include instructions configured to cause the computing device to reconstruct a first image based on a first portion of the scan data corresponding to the first FOV, and to reconstruct a second image based on a second portion of the scan data corresponding to the second FOV. The computer program product may further include instructions configured to cause the computing device to generate a third image based on the first image and the second image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting examples, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

It will be understood that the term "system," "unit," "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
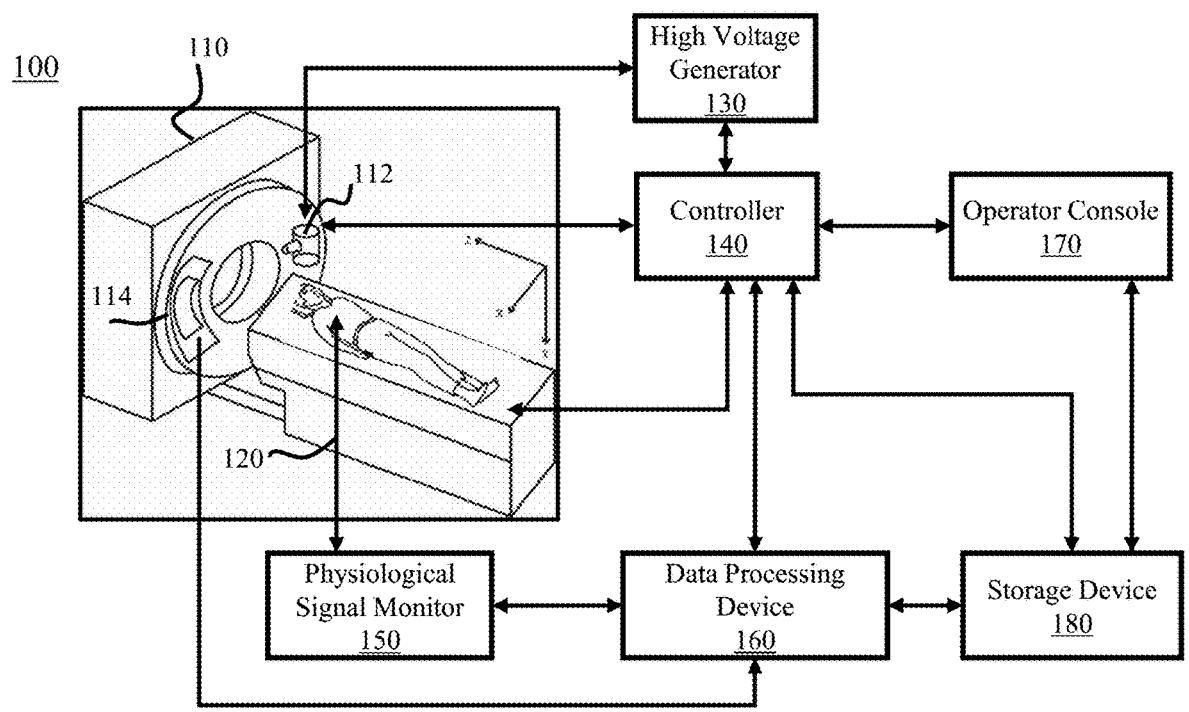
FIG. 1 is a schematic block diagram of an exemplary imaging system according to some embodiments of the present disclosure.

FIG. 1 is a schematic block diagram of an exemplary imaging system according to some embodiments of the present disclosure. As shown in the figure, imaging system 100 may include, among other things, a gantry 110, an object table 120, a high voltage generator 130, a controller 140, a physiological signal monitor 150, a data processing device 160, an operator console 170, and a storage device 180. It should be noted that the imaging system described below is merely provided for illustrating an example, and not intended to limit the scope of the present disclosure. The imaging system may find its applications in different fields, for example, medicine or industry. Merely by way of example, the imaging system may be a computed tomography (CT) system, a digital radiography (DR) system, a multi-modality system, or the like, or a combination thereof. Exemplary multi-modality system may include a computed tomography-positron emission tomography (CT-PET) system, a computed tomography-magnetic resonance imaging (CT-MRI) system, etc. As another example, the imaging system may be used in internal inspection of components including, for example, flaw detection, security scanning, failure analysis, metrology, assembly analysis, void analysis, wall thickness analysis, or the like, or a combination thereof.

Gantry 110 may include the components necessary to produce and detect radiation to generate an image. Gantry 110 may include, among other things, a tube 112 and a detector 114. Tube 112 may emit radiation that may be received by detector 114 after it passes through a subject exposed in the aperture of gantry 110. Merely by way of example, the radiation may include a particle ray, a photon ray, or the like, or a combination thereof. The particle ray may include neutron, proton (e.g., α-ray), electron (e.g., β-ray), μ-meson, heavy ion, or the like, or a combination thereof. The photon ray may include X-ray, γ-ray, ultraviolet, laser, or the like, or a combination thereof. The subject may include a substance, a tissue, an organ, an object, a specimen, a body, a human being, or the like, or a combination thereof. In some embodiments, tube 112 may be a cold cathode ion tube, a high vacuum hot cathode tube, a rotating anode tube, etc. The shape of the radiation emitted by tube 112 may be a line, a narrow pencil, a narrow fan, a fan, a cone, a wedge, an irregular shape, or the like, or a combination thereof.

The shape of detector 114 may be flat, arc-shaped, circular, or the like, or a combination thereof. The fan angle of the arc-shaped detector may be an angle from 0° to 360°, or from 30° to 270°, or 45° to 300°. In some embodiments, the fan angle of the arc-shaped detector may be an angle above 30°. In some embodiments, the fan angle of the arc-shaped detector may be an angle above 45°. For example, the fan angle of the arc-shaped detector may be one selected from 45°, 60°, 75°, 90°, 105°, etc. The fan angle may be fixed or adjustable according to different conditions including, for example, a desired resolution of an image, the size of an image, the sensitivity of a detector, the stability of a detector, or the like, or a combination thereof. In some embodiments, the pixels of an image generated based on the radiation received by detector 114 may be the number of the detector cells, e.g., the number of scintillator or photosensor, in detector 114. The detector cells may be arranged in a single row, two rows, or another number of rows. Detector 114 may be one-dimensional, two-dimensional, or three-dimensional.

Object table 120 may support a patient and move through the aperture of gantry 110 during an examination. As shown in FIG. 1, the direction of a patient being transmitted during an examination may be along the z direction. Depending on the region of interest (ROI) selected or the protocols selected, the patient may be positioned supine or prone, and either feet or head first. In some embodiments, object table 120 may be indexed between multiple scans. In some embodiments, object table 120 may be transmitted through gantry 110 at a constant speed. The speed may relate to the length of the area to be scanned, the total scan time, the pitch selected, or the like, or a combination thereof. In some embodiments, object table 120 may be used to support a subject other than a patient. Object table 120 may move the subject for examination through imaging system 100.

High voltage generator 130 may produce high voltage electricity and/or power, and transmit it to tube 112. The voltage generated by high voltage generator 130 may range from 80 kV to 140 kV, or from 120 kV to 140 kV. The current generated by high voltage generator 130 may range from 20 mA to 500 mA. In some embodiments, the voltage generated by high voltage generator 130 may range from 0 to 75 kV, or from 75 to 150 kV. It should be noted that, high voltage generator 130 may be located in gantry 110.

Controller 140 may communicate bi-directionally with gantry 110, tube 112, object table 120, high voltage generator 130, physiological signal monitor 150, data processing device 160, operator console 170, and/or storage device 180. Merely by way of example, gantry 110 may be controlled by controller 140 to rotate to a desired position that may be prescribed by a user via operator console 170. Controller 140 may control the transmitted speed of object table 120. Controller 140 may control the voltage generation of high voltage generator 130 of, for example, the magnitude of the voltage and/or the power generated by high voltage generator 130. As another example, controller 140 may control the display of images on operator console 170. For instance, the whole or part of an image may be displayed. In some embodiments, an image may be divided into several sub-portions, which may be displayed on a screen at the same time or in a certain order. According to some embodiments of the present disclosure, the user or the operator may select one or more sub-portions to display according to some conditions. Merely by way of example, the user may specify that an enlarged view of a sub-portion is to be displayed. Controller 140 may control storage device 180 to store data relating to imaging system 100, such as projected data relating to a subject generated by detector 114, an image generated by data processing device 160, a set of physiological data generated by physiological signal monitor 150, etc.

In some embodiments, controller 140 may include a processor, a processing core, a memory, or the like, or a combination thereof. For example, controller 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a microcontroller unit, a microprocessor, an advanced RISC machines processor (ARM), or the like, or a combinations thereof.

Physiological signal monitor 150 may detect a physiological signal relating to a subject (e.g., a patient). The physiological signal may include an electrocardiogram (ECG) signal, an electromyogram (EMG) signal, an electroencephalogram (EEG) signal, a respiratory signal, a pulse signal, or the like, or a combination thereof. Physiological signal monitor 150 may be connected to a patient via electrodes. The electrodes may acquire the physiological signal of the patient in parallel with an examination with gantry 110. In some embodiments, the electrodes may include an electrocardio electrode, a respiratory impedance electrode, a multi-electrode, or the like, or a combination thereof. For example, the electrodes may include at least one electrocardio electrode collecting the ECG signal of the patient. For another example, the electrodes may include at least one respiratory impedance electrode collecting the respiratory signal of the patient. In some embodiments, the electrodes may include at least one multi-electrode. The multi-electrode may collect the electrocardiogram ECG signal, the electromyography (EMG) signal, the electroencephalogram (EEG) signal, the respiratory signal, the pulse signal, or the like, or a combination thereof. In some embodiments, physiological signal monitor 150 may acquire the respiratory signal of the patient by a thermistor sensor.

In some embodiments, physiological signal monitor 150 may be connected to operator console 170. Operator console 170 may send a command to physiological signal monitor 150 by a user or an operator. The command may be an instruction to excite physiological signal monitor 150 to collect the physiological signal. In some embodiments, physiological signal monitor 150 may be connected to or communicate with data processing device 160. For example, the physiological signal generated by physiological signal monitor 150 may be obtained by data processing device 160 for generating an image relating to the subject.

Data processing device 160 may process data relating to a subject obtained from detector 114, physiological signal monitor 150, and/or storage device 180. The data may include scan data, a physiological signal, image data, or the like, or a combination thereof. For example, the scan data relating to a subject may be projected data corresponding to radiation generated by tube 112 traversing the subject. The physiological signal may be generated by physiological signal monitor 150. The image data may include an image relating to the subject. Data processing device 160 may process the scan data from gantry 110 to generate an image of a subject under examination. In some embodiments, data processing device 160 may preprocess, such as denoise, the scan data. In some embodiments, data processing device 160 may reconstruct an image based on an algorithm including, for example, Fourier slice theorem, filtered back projection algorithm, fan-beam reconstruction, iterative reconstruction, or the like, or a combination thereof. In some embodiments, data processing device 160 may preprocess, such as enhancing, the image.

In some embodiments, data processing device 160 may be connected to or communicate with detector 114, controller 140, physiological signal monitor 150, data processing device 160, operator console 170, and/or storage device 180 via a wireless connection, a wired connection, or a combination thereof. For example, data processing device 160 may transmit the image reconstructed based on the data from detector 114 to storage device 180. As another example, data processing device 160 may transmit an image to operator console 180 for display.

Operator console 170 may be coupled with controller 140 and/or data processing device 160. In some embodiments, operator console 170 may include an input device, a display screen, a control panel, etc. An input device may include alphanumeric and other keys that may be input via a keyboard, a touch screen (for example, with haptics or tactile feedback), a speech input, an eye tracking input, a brain monitoring device, or any other comparable input mechanism. Other types of the input device may include a cursor control device, such as a mouse, a trackball, or cursor direction keys, etc. In some embodiments, operator console 170 may display images generated by data processing device 160. In some embodiments, operator console 170 may send a command to data processing device 160, and/or controller 140. In some embodiments, operator console 170 may set parameters for a scan. The parameters may include scanning parameters (e.g., slice thickness) and/or reconstruction parameters (e.g., reconstruction FOV).

Storage device 180 may store relevant information of an image. The relevant information of the image may include parameters, an algorithm relating to process the image, an image, a model relating to a patient, an instruction and/or a signal to operate gantry 110, or the like, or a combination thereof. Parameters may include scanning parameters and/or reconstruction parameters. For example, the scanning parameters may include spiral scanning or non-spiral scanning, dose index, scanning FOV, tube potential, tube current, recon parameters (e.g., slice thickness, slice gap), scanning time, window parameters (e.g., window width, window center, etc.), collimation/slice width, beam filtration, helical pitch, or the like, or a combination thereof. The reconstruction parameters may include reconstruction FOV, reconstruction matrix, convolution kernel/reconstruction filter, or the like, or a combination thereof. The algorithm may include an image reconstruction algorithm, an image pre-processing algorithm, an image post-processing algorithm, etc. The image may include a raw image or a processed image (e.g., an image after preprocessing). The model relating to a patient may include the background information of the patient, such as, ethnicity, citizenship, religion, gender, age, matrimony state, height, weight, medical history (e.g., history relating to different organs, or tissues), job, personal habits, or the like, or a combination thereof.

Storage device 180 may be a hierarchical database, a network database, a relational database, or the like, or a combination thereof. Storage device 180 may store the operational parameters related with imaging system 100. Storage device 180 may be local, or remote. In some embodiments, storage device 180 may be a storage device that stores information with electric energy, such as a random access memory (RAM), a read only memory (ROM), or the like, or a combination thereof. The random access memory (RAM) may include a dekatron, a selectron, a delay line memory, a Williams tube, a dynamic random access memory (DRAM), a static random access memory (SRAM), a thyristor random access memory (T-RAM), a zero capacitor random access memory (Z-RAM) or a combination thereof. The read only memory (ROM) may include a read-only memory bubble memory, a magnetic button line memory, a memory thin film, a magnetic plate line memory, a core memory, a magnetic drum memory, a CD-ROM drive, a hard disk, a magnetic tape, a nonvolatile memory early (the NVRAM), a phase change memory, a magnetoresistive random access memory modules, a ferroelectric random access memory, a nonvolatile SRAM, a flash memory, a type of electronic erasing rewritable read-only memory, an erasable programmable read-only memory, a programmable read-only memory, a mask ROM, a floating connecting doors random access memory, a nano random access memory, a racetrack memory, a variable resistive memory, a programmable metallization cell and the like, or a combination thereof. In some embodiments, storage device 180 may be a storage device that stores information with magnetic energy such as hard disk, magnetic tape, magnetic core memory, bubble memory, U disk, flash memory or the like, or a combination thereof. In some embodiments, storage device 180 may be a storage device that store information with optics energy such as CD, DVD, or the like, or a combination thereof.

In some embodiments, imaging system 100 may be connected to a network. The network may be a local area network (LAN), a wide area network (WAN), a public network, a private network, a proprietary network, a public switched telephone network (PSTN), the Internet, virtual networks, metropolitan area networks, telephone networks or the like, or a combination thereof. The connection between different components in imaging system 100 may be wired or wireless. The wired connection may include using a metal cable, an optical cable, a hybrid cable, an interface, or the like, or a combination thereof. The wireless connection may include using a Wireless Local Area Network (WLAN), a Wireless Wide Area Network (WWAN), a Bluetooth, a ZigBee, a Near Field Communication (NFC), or the like, or a combination thereof.

It should be noted that the description of the imaging system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. In some embodiments, the assembly and/or function of imaging system 100 may be varied or changed according to specific implementation scenarios. For example, controller 140 and data processing device 160 may be integrated into one single module. As another example, some other components may be added into imaging system 100, such as a patient positioning unit, a high-voltage tank, an amplifier unit, a storage unit, an analog-to-digital converter, a digital-to-analog converter, an interface circuit, or the like, or a combination thereof. Merely by way of example, gantry 110 may further include a microphone, sagittal laser alignment light, patient guide lights, X-ray exposure indicator light, energy stop buttons, gantry control panels, external laser alignment lights, etc.

Figure 2:
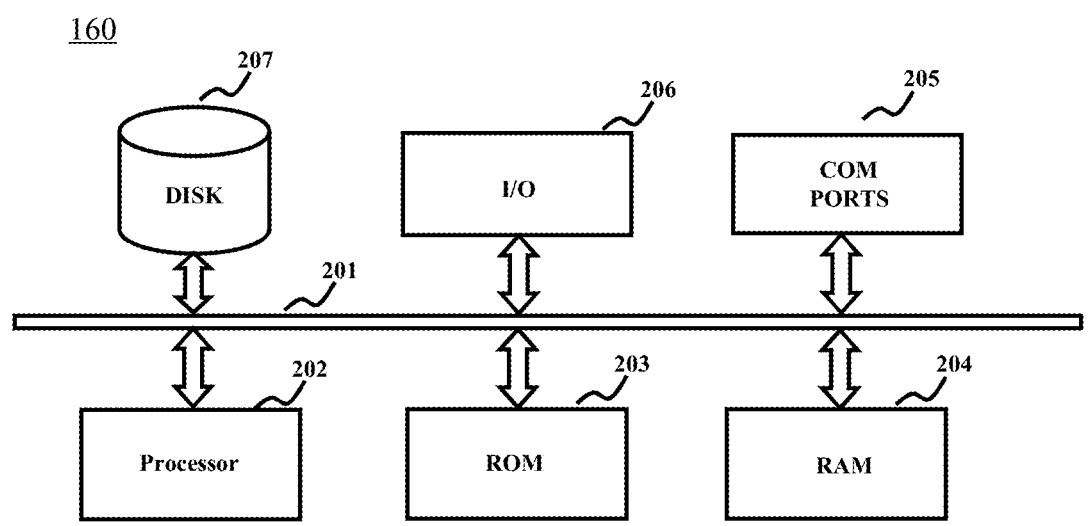
FIG. 2 illustrates an exemplary architecture of a computing device according to some embodiments of the present disclosure.

FIG. 2 illustrates an exemplary architecture of a computing device according to some embodiments of the present disclosure. Data processing device 160 may be implemented on the computing device via its hardware, software program, firmware, or a combination thereof. Although only one such computing device is shown, for convenience, the functions of data processing device 160 described in this disclosure may be implemented in a distributed fashion on a number of similar platforms, to distribute the processing load. Data processing device 160 may include, among other things, an internal communication bus 201, a processor 202, a program storage and data storage of different forms (e.g., a disk 207, a read only memory (ROM) 203, or a random access memory (RAM) 204), for various data files to be processed and/or communicated by the computer, as well as possibly program instructions to be executed by processor 202. Aspects of the methods of the image processing and/or other processes, as outlined herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media may include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a mammography system into the hardware platform(s) of a computing environment or other system implementing a computing environment or similar functionalities in connection with the image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A computer-readable medium may take many forms including, for example, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signal, or acoustic or light waves such as those generated during radio frequency (RF) and infrared (IR) data communications. Common forms of computer-readable media therefore may include for example: a floppy disk, a flexible disk, a hard disk, a magnetic tape, any other magnetic medium, a CD-ROM, a DVD or DVD-ROM, any other optical medium, punch cards paper tape, any other physical storage medium with patterns of holes, a RAM, a PROM and an EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Processor 202 may be configured to execute program instructions stored in a storage device (e.g., disk 207, ROM 203, RAM 204) to perform one or more functions of data processing device 160 described in this disclosure. Processor 202 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a microcontroller unit, an advanced RISC machines processor (ARM), or the like, or a combinations thereof.

Data processing device 160 may also include a COM ports 205 connected to and from a network connected thereto to facilitate data communications.

Those skilled in the art will recognize that the present teachings are amenable to a variety of modifications and/or enhancements. For example, although the implementation of various components described herein may be embodied in a hardware device, it may also be implemented as a software only solution, for example, an installation on an existing server. In addition, data processing device 160 as disclosed herein may be implemented as a firmware, firmware/software combination, firmware/hardware combination, or a hardware/firmware/software combination.

Figure 3:
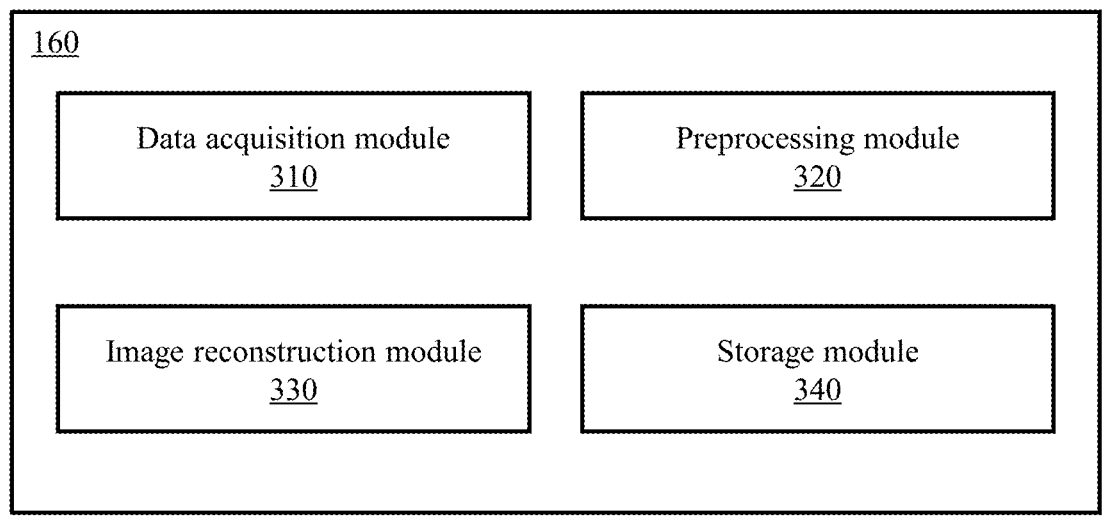
FIG. 3 illustrates an exemplary block diagram of a data processing device according to some embodiments of the present disclosure.

FIG. 3 illustrates an exemplary block diagram of a data processing device according to some embodiments of the present disclosure. As shown in the figure, data processing device 160 may include a data acquisition module 310, a preprocessing module 320, an image reconstruction module 330, and a storage module 340. Generally, the word "module" as used herein, refers to logic embodied in hardware or firmware, or to a collection of software instructions. The modules described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 202) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

The modules of data processing device 160 may communicate with each other via a wireless connection, a wired connection, or a combination thereof. As an example, the wired connection may include the internal communication bus 201. As another example, the different modules may be connected to and from a network to facilitate data communications via COM ports 205 as illustrated in FIG. 2.

Data acquisition module 310 may obtain data relating to an image reconstruction. The data may include scan data (e.g., the projected data), a physiological signal, or the like, or a combination thereof. Data acquisition module 310 may obtain the scan data from gantry 110 (e.g., detector 114). The scan data may contain characteristic information of the subject, such as density, thickness, composition, etc. Data acquisition module 310 may obtain the physiological signal from physiological signal monitor 150. The physiological signal may include an electrocardiogram (ECG), an electromyography (EMG) signal, an electroencephalogram (EEG) signal, a respiratory signal, a pulse signal, or the like, or a combination thereof. In some embodiments, data acquisition module 310 may obtain the data from storage device 180. In some embodiments, data acquisition module 310 may acquire the data from other modules via the I/O port 206 illustrated in FIG. 2.

Preprocessing module 320 may perform a preprocessing process on, for example, the scan data obtained by data acquisition module 310. The first preprocessing may include a center calibration, a detector gain calibration, a beam hardening calibration, a scattering calibration, a denoising operation, or the like, or a combination thereof. In some embodiments, preprocessing module 320 may perform an additional preprocessing process on, for example, an image generated by image reconstruction module 330. The preprocessing may include a process of geometrical transformation, a process of image smoothing, a process of image enhancing, or the like, or a combination thereof.

Image reconstruction module 330 may reconstruct an image based on the data relating to a subject obtained by data acquisition module 310, including the scan data and the physiological signal described elsewhere in the disclosure. In some embodiments, image reconstruction module 330 may reconstruct the image based on an image reconstruction technique. The image reconstruction technique may include applying a suitable analytical, iterative, and/or other reconstruction technique. The analytical reconstruction technique may include applying filtered back projection algorithm (FBP), convolution back projection algorithm (CBP), Fourier transform algorithm, Radon transform algorithm, or the like, or a combination thereof. The iterative reconstruction technique may include applying algebraic reconstruction algorithm (ART), simultaneous algebraic reconstruction algorithm (SART), modified simultaneous algebraic reconstruction algorithm (MSART), ordered subsets algorithm (OS), maximum entropy iterative algorithm, maximum likelihood-expectation maximization algorithm (ML-EM), ordered subsets-expectation maximization algorithm (OS-EM), row-action maximum likelihood (RAMLA), Gibbs smoothing reconstruction algorithm, Bayesian reconstruction algorithm or the like, or a combination thereof.

In some embodiments, image reconstruction module 330 may be connected to or communicate with data acquisition module 310, preprocessing module 320, or/and storage module 340. For example, image reconstruction module 330 may obtain the scan data (e.g., the projected data) from data acquisition module 310 or the denoised scan data from preprocessing module 320 to reconstruct an image. As another example, image reconstruction module 330 may transmit a reconstructed image in storage module 340.

Storage module 340 may store information generated in a process for reconstructing an image relating to a subject. The information generated in the process may include scan data relating to a subject, a physiological signal, an image reconstruction technique, an image, parameters relating to an image reconstruction, or the like, or a combination thereof. The scan data may include raw data (e.g., the projected data obtained by data acquisition module 310) or processed data (e.g., the scan data after preprocessing by preprocessing module 320). The image reconstruction technique may include a series of algorithm as described elsewhere in the disclosure. The reconstructed image may include a raw image (e.g., an image generated by image generation module 330) or a processed image (e.g., an image after preprocessing by processing module 320). The parameters relating to an image reconstruction may include a FOV (e.g., a scan FOV or a reconstruction FOV), a weighting function, or the like, or a combination thereof.

Storage module 340 may include a random access memory (RAM), a read only memory (ROM), or the like, or a combination thereof. The random access memory (RAM) may include a dekatron, a dynamic random access memory (DRAM), a static random access memory (SRAM), a thyristor random access memory (T-RAM), a zero capacitor random access memory (Z-RAM) or a combination thereof. The read only memory (ROM) may include a bubble memory, a magnetic button line memory, a memory thin film, a magnetic plate line memory, a core memory, a magnetic drum memory, a CD-ROM drive, a hard disk, a flash memory, or the like, or a combination thereof. For example, storage module 340 may perform a function of storing data via disk 207, ROM 203, or RAM 204.

It should be appreciated that data processing device 160 shown in FIG. 3 may be implemented in various ways. In some embodiments, data processing device 160 may be implemented by a hardware, a software, or a combination of software and hardware. In some embodiments, the modules may by implemented by a hardware circuit of a programmable hardware device including a super LSI, a gate array, semiconductor logic chips, transistors, a field programmable gate array, programmable logic devices or the like, or a combination thereof. In some embodiments, the modules may be implemented by a software. The software portion may be stored in storage device 180, storage module 340, or other storage device. The software portion may be implemented by an instruction execution module, e.g., a microprocessor or a dedicated hardware.

It should be noted that the description of data processing device 160 is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, preprocessing module 320 may be omitted from data processing device 160. In some embodiments, data acquisition module 310 and preprocessing module 320 may be integrated into one single module.

Figure 4:
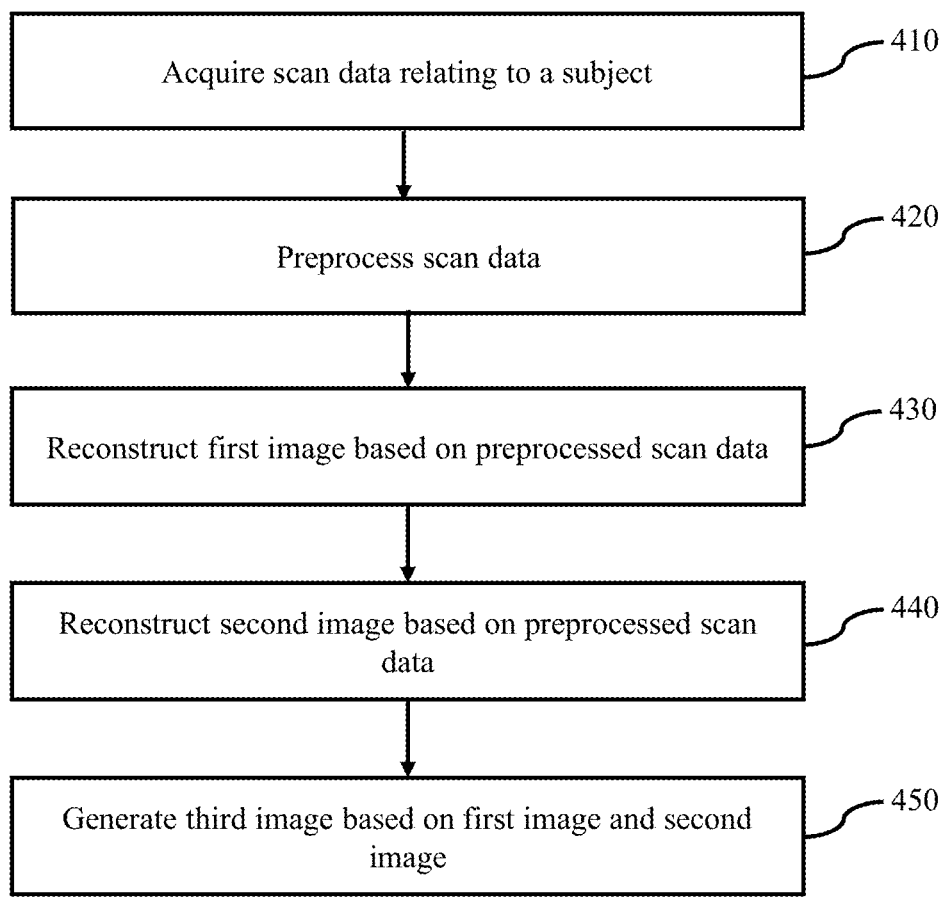
FIG. 4 is a flowchart illustrating an exemplary process for reconstructing an image relating to a subject according to some embodiments of the present disclosure.

FIG. 4 is a flowchart illustrating an exemplary process for reconstructing an image according to some embodiments of the present disclosure. In some embodiments, process 400 may be performed by data processing device 160.

In 410, scan data relating to a subject may be obtained. In some embodiments, step 410 may be performed by data acquisition unit 310. The subject may include a substance, a tissue, an organ, an object, a specimen, a body, a human being, or the like, or a combination thereof. In some embodiments, the scan data relating to the subject may include raw data (e.g., the projected data) as described elsewhere in the disclosure.

In 420, the scan data relating to the subject may be preprocessed. In some embodiments, the scan data may be preprocessed by preprocessing module 320. In some embodiments, the preprocessing may include a center calibration, a detector gain calibration, a beam hardening calibration, a scattering calibration, a denoising operation, or the like, or a combination thereof. The center calibration may include a model calibration, including scanning a specific needle model to obtain the scan data of the model; determining a projected center of the scan data based on an iteration algorithm; scanning a subject and calibrating the scan data relating to the subject with the projected center determined by the model. The detector gain calibration may include a threshold-based calibration, a bad pixels calibration, a dark frame calibration, or the like, or a combination thereof. The beam hardening calibration may include a polynomial fitting, an iteration calibration, a dual-energy imaging, or the like, or a combination thereof. The scatter calibration may include applying a high-pass filtering, a scattering deconvolution algorithm, an ordered subsets convex iteration algorithm, or the like, or a combination thereof. The denoising operation may include applying a spatial-domain filter, a transform-domain filter, a morphological noise filter, or the like, or a combination thereof. The spatial-domain filter may include a field average filter, a median filter, a Gaunssian filter, or the like, or a combination thereof. The transform-domain filter may perform a Fourier transform, a Walsh-Hadamard transform, a cosine transform, a K-L transform, a wavelet transform, or the like, or a combination thereof. The morphological noise filter may perform an expansion operation, a corrosion operation, an open operation, a closed operation, a hit and miss transform, or the like, or a combination thereof. In some embodiments, the denoising operation may be performed by applying a partial differential equation or a variational technique. The partial differential equation may include a Perona equation, a Malik equation, or the like, or a combination thereof.

In 430, a first image may be reconstructed based on the preprocessed scan data and/or the scan data obtained in step 410. In some embodiments, the first image may be reconstructed by image reconstruction module 330. In some embodiments, the first image may be reconstructed based on an image reconstruction technique as described elsewhere in the disclosure. In some embodiments, the first image may include at least one portion of the subject.

In 440, a second image may be reconstructed based on the preprocessed scan data and/or the scan data obtained in step 410. In some embodiments, the second image may be reconstructed by image reconstruction unit 330. In some embodiments, the second image may be reconstructed based on an image reconstruction technique as described elsewhere in the disclosure. In some embodiments, the first image and the second image may be reconstructed based on a same image reconstruction technique. For example, the first image and the second image may be reconstructed based on the filtered back projection algorithm (FBP). In some embodiments, the first image and the second image may be reconstructed based on a different image reconstruction technique. For example, the first image may be reconstructed based on the filtered back projection algorithm (FBP) and the second image may be reconstructed based on the algebraic reconstruction algorithm (ART).

In some embodiments, the first image and the second image may demonstrate a same subject (e.g., the heart) in different field of views (FOVs). For illustration purpose, the FOV corresponding to the first image may be smaller than the FOV corresponding to the second image. Thus, the first image may present a first region of the subject, such as a center region of the subject. The second image may present a second region of the subject, such as the whole region of the subject including the center region of the subject and the edge region of the subject. Specifically, the second image may cover a larger region than the second region of the subject (e.g., a lung tissue around the heart).

In some embodiments, the first image and the second image may have a same size, meaning that the first image and the second image may include a same number of pixels. The resolution of the same object (e.g., a region of interest) presented in the first image may be higher than the resolution presented in the second image. In some embodiments, the first image and the second image have different sizes. The size of the object presented in the first image may be same with the size of the same object presented in the second image, meaning that the same region of the subject may be presented in the first image and the second image with a same number of pixels.

In some embodiments, the first image and the second image may be reconstructed based on the scan data and a physiological signal detected by physiological signal monitor 150. The physiological signal may be used to determine a portion of the scan data. The first image and the second image may be reconstructed based on different portions of the scan data (e.g., the description in connection with process 700 or process 800).

In 450, a third image may be generated based on the first image and the second image. In some embodiments, the third image may be generated by image reconstruction module 330.

In some embodiments, the first image and the second image may be preprocessed before the generation of the third image, and the third image may be generated based on the preprocessed first image and the preprocessed second image. Merely by way of example, the third image may be generated by performing an addition operation on grey-level values of the preprocessed first image and the preprocessed second image. In some embodiments, before the addition operation, the first image and the second image may be weighted based on different weighting functions. Thus, the third image may be generated based on the combination of the first weighted image and the second weighted image.

The preprocessing on the first image and/or the second image may include a process of geometrical transformation, a process of image smoothing, a process of image enhancing, or the like, or a combination thereof. The geometrical transformation may include a zooming operation, a translation operation, a mirror operation, a revolve operation, or the like, or a combination thereof. Specifically, the image smoothing operation may be performed based on a Gaussian filter, an average filter, a median filter, a wavelet transformation, or the like, or a combination thereof. The enhancing operation may include a histogram equalization, an image sharpening, a Fourier transform, a high-pass filtering, a low-pass filtering, or the like, or a combination thereof. For example, the first image may be scaled down such that the size of a region of a subject presented in the first image may be equal to the size of the same region of the subject presented in the second image. As another example, the second image may be scaled up such that the size of a region of a subject presented in the second image may be equal to the size of the same region of the subject presented in the first image.

It should be noted that the description of the imaging system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, step 430 and step 440 may be performed synchronously. In some embodiments, step 420 may be optional.

Figure 5:
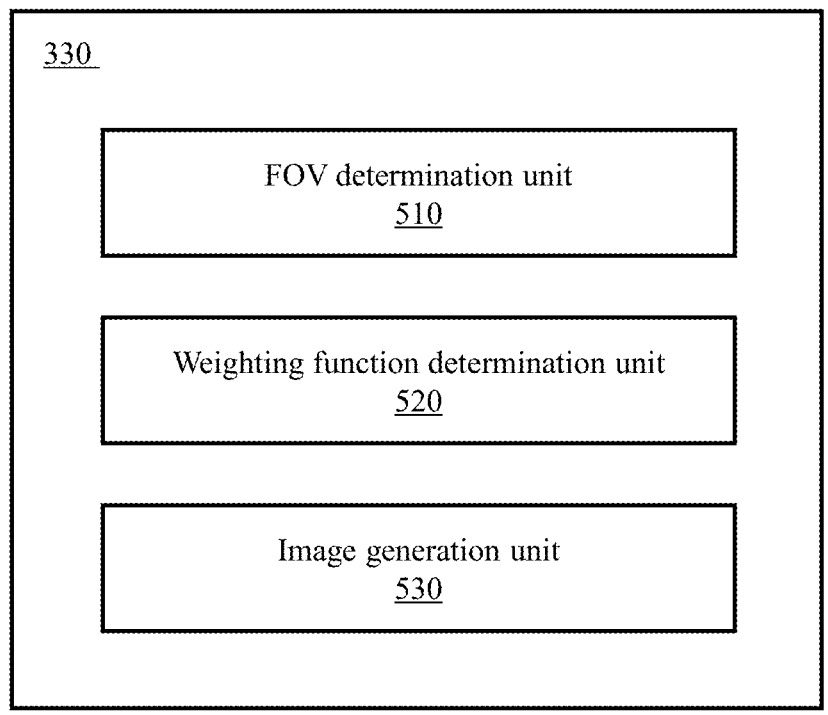
FIG. 5 illustrates an exemplary block diagram of an image reconstruction module according to some embodiments of the present disclosure.

FIG. 5 illustrates an exemplary block diagram of an image reconstruction module according to some embodiments of the present disclosure. Image reconstruction module 330 may include an FOV determination unit 510, a weighting function determination unit 520, and an image generation unit 530.

FOV determination unit 510 may determine an FOV for reconstructing an image. The FOV may denote the physical dimension of a subject presented in an image, such as length and width of the subject. In some embodiments, multiple FOVs may be determined during the image reconstruction process. For example, a first FOV may include a specific subject and tissues or organs adjacent to the specific subject. A second FOV may include the specific subject or a portion thereof. Furthermore, images may be reconstructed based on the multiple FOVs for subsequent processing. In some embodiments, the FOV may be determined before or after scanning the subject.

In some embodiments, the FOV may be determined by an operator manually. For example, a scout image may be obtained by scanning a subject with a scanning device. Then, the operator may set an FOV via, such as a rectangle frame, a parallelogram, or a round, on the scout image by operator console 170. The size of the FOV may be adjusted by an operator with operator console 170 such as adjusting the size of rectangle frame by a mouse. As another example, the operator may enter the size of the FOV via operator console 170 directly and locate the FOV at a specific subject by, for example, moving the rectangle frame on the scout image. In some embodiments, the FOV may be determined automatically based on an algorithm. For example, the FOV may be determined by including the edge of the subject. The edge detection may include a search-based algorithm and/or a zero-crossing based algorithm. The search-based algorithm may detect edges by assessing an edge strength, such as the gradient magnitude via a first-order derivative expression, and searching for a local directional maxima of the gradient magnitude using an estimate of the local orientation of the edge, such as the gradient direction. In some embodiments, the operation of the first-order derivative of grey-level values of pixels in the second region may be performed by a Roberts Cross operator, a Prewitt operator, a Sobel operator, a Kirsch operator, a Compass operator, or the like, or a combination thereof. The zero-crossing based algorithm may search for zero crossings in a second-order derivative of grey-level values of pixels in the second region to find the edge. In some embodiments, the operation of the second-order derivative expression may be performed by a Marr-Hildreth operator, a Canny operator, a Laplacian operator, or the like, or a combination thereof.

Weighting function determination unit 520 may determine a weighting function. In some embodiments, weighting function determination unit 520 may be connected to or communicate with FOV determination unit 510. For example, weighting function determination unit 520 may generate a weighting function based on an FOV determined by FOV determination unit 510. The weighting function may be used to select a portion of the scan data corresponding to the FOV for reconstructing an image. In some embodiments, weighting function determination unit 520 may be connected to or communicate with image generation unit 530. For example, weighting function determination unit 520 may generate a weighting function based an image generated by image generation unit 530 (e.g., a raw image or a preprocessed image preprocessed by preprocessing module 320). For illustration purpose, the weighting values generated by the weighting function may be determined based on a specific location of a pixel in the image. In some embodiments, the weighting values of pixels in one portion of the image may vary with the distance from a pixel in the portion to the center of the image. In some embodiments, the weighting values of pixels in another portion of the image may be a constant value (e.g., a value in the range from 0 to 1).

Image generation unit 530 may generate an image. In some embodiments, image generation unit 530 may generate a first image corresponding to a first FOV and/or a second image corresponding to a second FOV. In some embodiments, image generation unit 530 may generate an third image based on the first image, the second image, and/or at least one weighting function generated by weighting function determination unit 520. The first image and the second image may be generated based on a same or different image reconstruction technique(s) as described elsewhere in the disclosure.

It should be noted that the description of the imaging system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. In some embodiments, FOV determination unit 510 and weighting function determination unit 520 may be integrated into one single unit. In some embodiments, image generation unit 530 may include a first image determination unit, a second image determination unit, or/and the third image determination unit.

Figure 6:
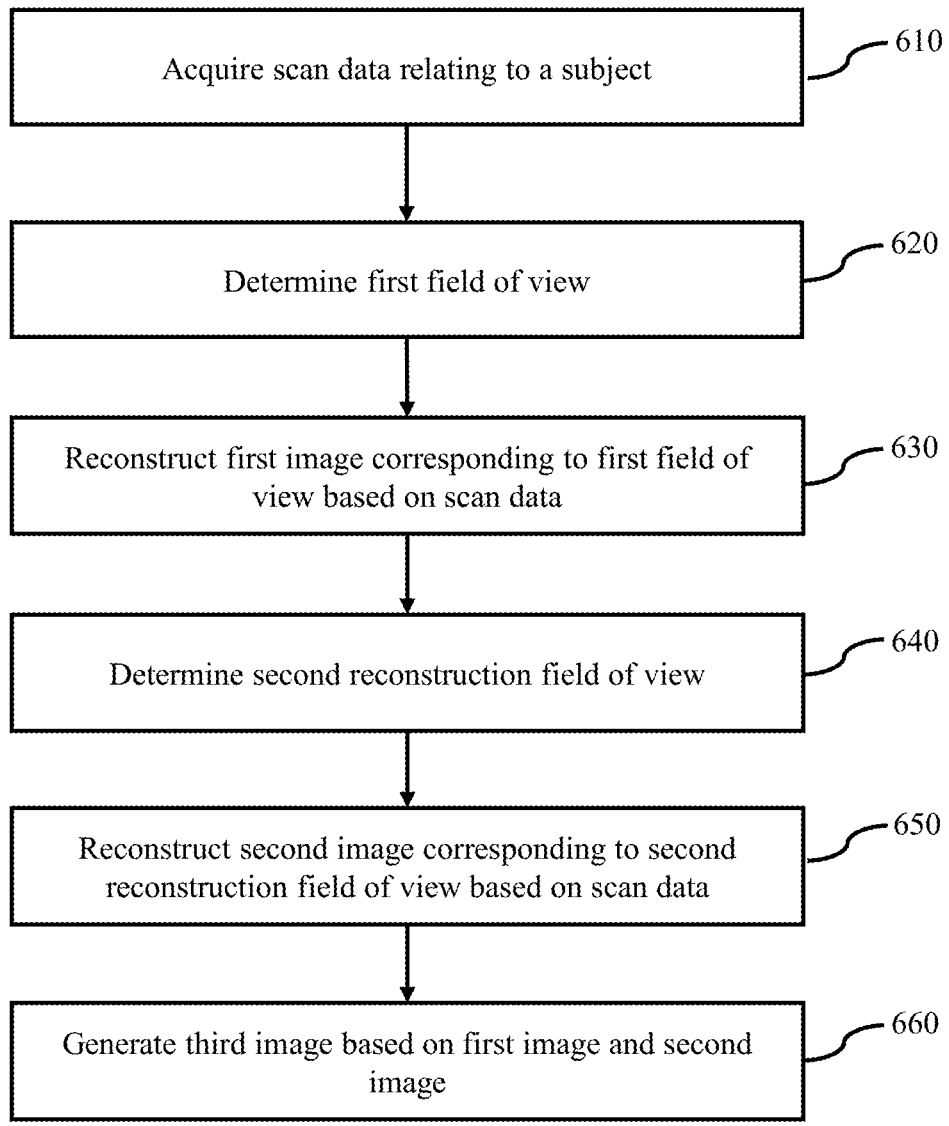
FIG. 6 is a flowchart illustrating an exemplary process for reconstructing an image relating to a subject according to some embodiments of the present disclosure.

FIG. 6 is a flowchart illustrating an exemplary process for reconstructing an image relating to a subject according to some embodiments of the present disclosure. In some embodiments, process 600 may be performed by image reconstruction module 330. In some embodiments, step 430 illustrated in FIG. 4 may be performed according to steps 620 and 630. In some embodiment, step 440 illustrated in FIG. 4 may be performed according to steps 640 and 650.

In 610, the scan data relating to a subject may be acquired as described elsewhere in this disclosure with respect to step 410. In some embodiments, the scan data may be acquired by data acquisition module 310.

In 620, a first FOV may be determined. The first FOV may be determined by FOV determination unit 510 as described elsewhere in the disclosure. The first FOV may determine the size and location of a subject presented in a reconstructed image. In some embodiments, the first FOV may be set by a rectangle frame with a side length (e.g., 200 mm). The rectangle frame may be adjusted to cover a first region of interest by moving or scaling the rectangle frame on, for example, operator console 170 (e.g., a mouse). The adjustment of the rectangle frame may be performed manually or automatically. As a result, the region within the rectangle frame may be presented in a reconstructed image.

In 630, a first image may be reconstructed based on the scan data corresponding to the first FOV. In some embodiments, the first image may be reconstructed by image generation unit 530 based on an image reconstruction technique as described elsewhere in the disclosure.

In 640, a second FOV may be determined. The second FOV may be determined by FOV determination unit 510 as described elsewhere in the disclosure. The second FOV and the first FOV may include a same object (e.g., the heart) or a portion thereof. In some embodiments, the second FOV may present a larger view than the first FOV. For example, the first FOV may cover a heart region, while the second FOV may cover the heart region as well as a surrounding region of the heart (e.g., the lung tissue around the heart). The second FOV may be set by a rectangle frame with a side length (e.g., 350 mm) different from the side length of the first FOV. The rectangle frame may be adjusted to cover a second region of interest by moving or scaling the rectangle frame on, for example, operator console 170 by, for example, a mouse. The adjustment of the rectangle frame may be performed manually or automatically. As a result, the region within the rectangle frame may be presented in a reconstructed image.

In 650, a second image may be reconstructed based on the scan data corresponding to the second FOV. In some embodiments, the second image may be reconstructed by image generation unit 530 based on an image reconstruction technique as described elsewhere in the disclosure.

In 660, a third image may be generated based on the first image and the second image as described above with respect to step 450. In some embodiments, the third image may be generated by replacing a portion of the second image with a portion of the first image. In some embodiments, the third image may be generated by performing a mathematical operation on the grey-level values of the first image and the second image. For example, the addition operation of grey-level values of the first image and the second image may be performed in association with weighting functions generated by, for example, weighting function determination unit 520.

It should be noted that the description of the imaging system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. In some embodiments, step 620 and step 640 may be performed synchronously. Step 630 and step 650 may be performed synchronously. In some embodiments, the scan data acquired in step 610 may be preprocessed before reconstructing the first image and the second image.

Figure 7:
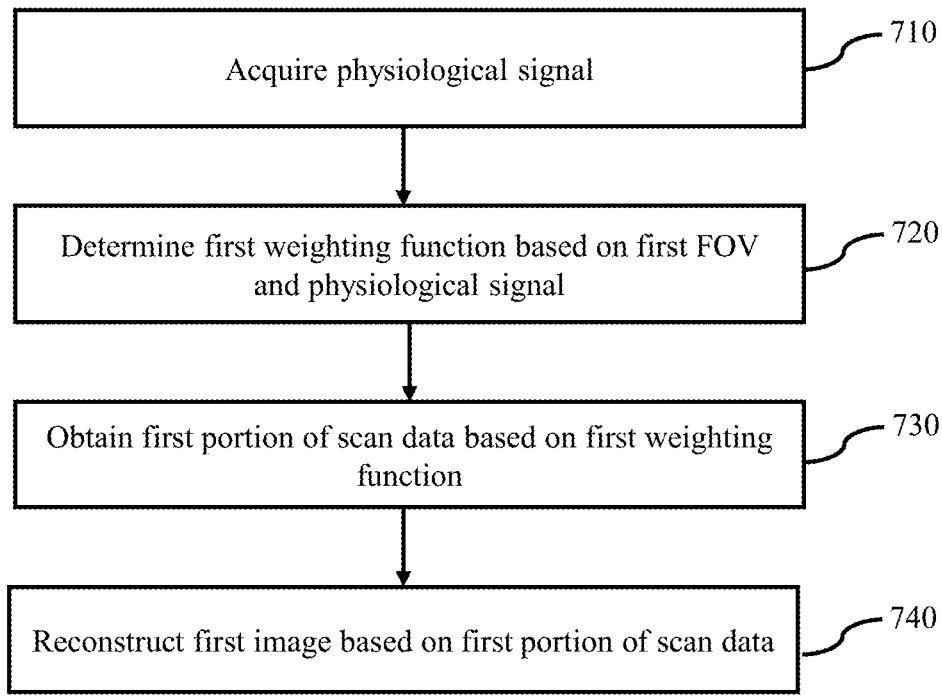
FIG. 7 is a flowchart illustrating an exemplary process for reconstructing a first image according to some embodiments of the present disclosure.

FIG. 7 is a flowchart illustrating an exemplary process for reconstructing a first image according to some embodiments of the present disclosure. In some embodiments, process 700 may be performed by image reconstruction module 330. In some embodiments, step 630 of process 600 (illustrated in FIG. 6) may be performed according to process 700.

In 710, a physiological signal relating to the subject may be detected by physiological signal monitor 150. In some embodiments, the physiological signal detected by physiological signal monitor 150 may be acquired by data acquisition module 310. In some embodiments, the physiological signal may be detected simultaneously with the scan data by physiological signal monitor 150. In some embodiments, the motion relating to a subject (e.g., heartbeat, pulmonary respiration, abdominal motion, etc.) may incur motion artifact in a reconstructed image of the subject. The physiological signal may contain information of the motion relating to the subject. For example, the electrocardiogram (ECG) signal may reflect the changes in the heartbeat amplitude over time. In some embodiments, a scanning device may be triggered to perform the scan according to the physiological signal. For example, the scanning device may be controlled by controller 140 or data processing device 160 to scan the subject if the motion amplitude of the subject reflected in the physiological signal is relatively small. In some embodiments, the physiological signal may be used to determine a portion of the scan data for reconstructing an image. For example, the portion of the scan data may be determined when the motion amplitude of the subject reflected in the physiological data is relatively small.

Figure 10A:
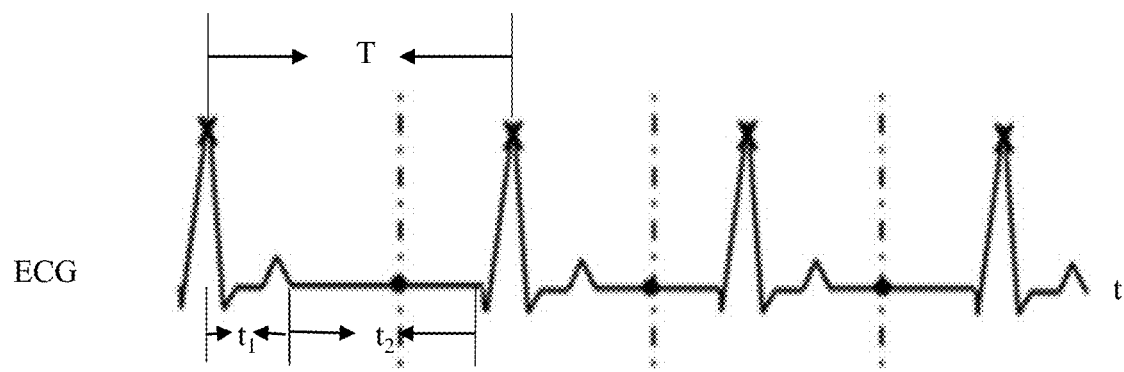
FIG. 10A is an exemplary electrocardiogram (ECG) according to some embodiments of the present disclosure.

In some embodiments, the physiological signal may be identified via the analysis of the scan data. For example, the physiological signal may be identified by analyzing a motion parameter of the subject (e.g., the position of center of mass) characterized in the scan data. Specifically, the position of center of mass may be plotted with time, showing the physiological signal (e.g., the movement phase) of the subject. Merely by way of example, the physiological signal may include an electrocardiogram (ECG) signal, an electromyography (EMG) signal, an electroencephalogram (EEG) signal, a respiratory signal, a pulse signal, or the like, or a combination thereof. The physiological signal may include information relating to the movement of a subject (e.g., the heart, the lung, the abdomen, the liver, etc.) with time. The movement may include incompressible organ deformation (e.g., movement of the liver associated with breathing), compressible organ deformation (e.g., movement of the heart associated with its beating), etc. The information relating to the movement may include the movement rate, the movement amplitude or displacement, the phase position of the subject, etc. For example, the ECG signal may represent changes of heart rate or heartbeat amplitude over the time as shown in FIG. 10A. In some embodiments, the movement phase of the subject may include a resting (or relaxation) phase with a small movement rate or amplitude (e.g., a diastolic of the heart) and a tension phase with a large movement rate or amplitude (e.g., a systolic of the heart). In some embodiments, the small movement rate or amplitude may denote that the movement rate or amplitude approximate of a subject is less than a threshold or approximate to or equal to 0. The large movement rate or amplitude may denote that the movement rate or amplitude of the subject is greater than a threshold approximate to or equal to a maximum. According to FIG. 10A, the heart performs a periodic movement, including an alternating sequence of a resting (or relaxation) phase and a tension phase. The physiological signal may be used to identify the resting (or relaxation) phase and the tension phase.

In 720, a first weighting function may be determined based on a first FOV and the physiological signal. In some embodiments, the determination of the first weighting function may be performed by weighting function determination unit 520. In some embodiments, the first weighting function may include a plurality of first weighting values corresponding to different movement phases. The first weighting values may be in a range from 0 to 1. For example, if the subject moves dramatically during the tension phase, the first weighting values corresponding to the tension phase may be relatively small, such as approximate to or equal to 0; if the subject moves gently during the resting phase, the weighting values corresponding to the resting phase may be relatively large, such as approximate to or equal to 1.

Figure 10B:
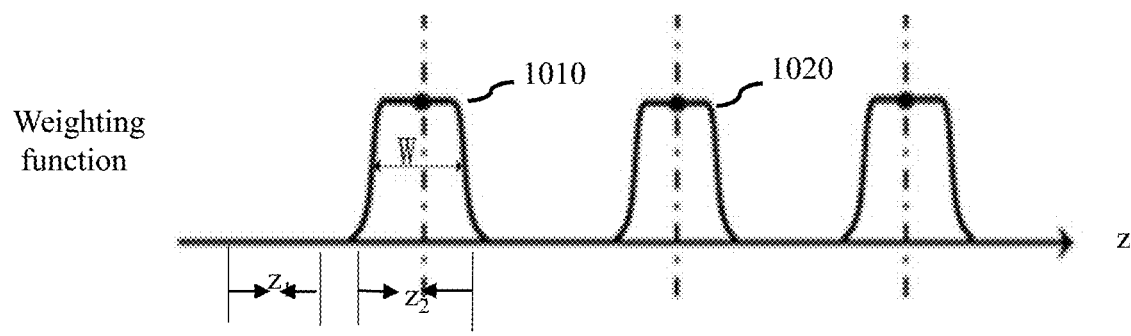
FIG. 10B is an exemplary weighting function curve according to some embodiments of the present disclosure.

In some embodiments, a plurality of first strobe windows may be generated based on the first weighting function as illustrated in FIG. 10B. Referring to FIG. 10B, each first strobe window (e.g., a strobe window 1010 or a strobe window 1020) may include a plurality of non-zero weighting values. The first strobe windows may be characterized by a plurality of parameters, such as center axis, half-peak width, height, etc. In some embodiments, the first weighting function may be determined based on the physiological signal and the first FOV. For example, the location of the first strobe windows may be determined based on the physiological signal. Specifically, the center axis of a first strobe window may be located at a moment when the movement rate or the movement amplitude of the subject is minimum. As another example, the half-peak width of the first strobe windows may be determined based on the FOV. The larger the first FOV is, the greater the half-peak width of the first strobe windows may be.

Referring back to FIG. 7, in 730, a first portion of the scan data may be extracted from the scan data (or the preprocessed scan data if the scan data have been preprocessed) based on the first weighting function. In some embodiments, the first portion of the scan data may be obtained by weighting function determination unit 520. The first portion of the scan data may be used for reconstructing an image corresponding to the first FOV. In some embodiments, the first portion of the scan data may be obtained by multiplying the first weighting function with the scan data. For example, the first portion of the scan data may include the scan data acquired by a scanning device (such as gantry 110 in FIG. 1) at a time when the weighting values are non-zero. Specially, the first weighting value generated may be multiplied with the scan data obtained at a same time. The scan data acquired at a time (e.g., interval $z_2$ corresponding to the weighting value 1 in FIG. 10B) may be used for reconstructing the image, while the scan data acquired at a time (e.g., interval $z_1$ corresponding to the weighting value 0) may be removed away.

In 740, a first image may be reconstructed based on the first portion of the scan data. In some embodiments, the reconstruction of the first image may be performed by image generation unit 530. The first image may be reconstructed based on a reconstruction technique as described elsewhere in the disclosure.

It should be noted that the description of process 700 is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, the first portion of the scan data may be preprocessed before step 740 as illustrated in step 420.

Figure 8:
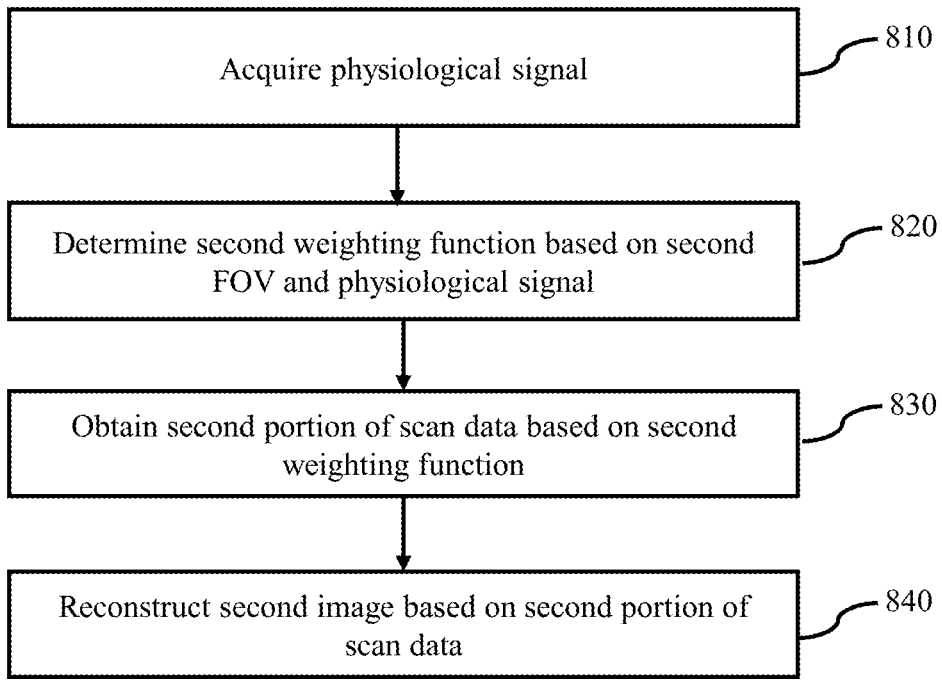
FIG. 8 is a flowchart illustrating an exemplary process for reconstructing a second image according to some embodiments of the present disclosure.

FIG. 8 is a flowchart illustrating an exemplary process for reconstructing a second image according to some embodiments of the present disclosure. In some embodiments, process 800 may be performed by image reconstruction module 330. In some embodiments, step 650 of process 600 (illustrated in FIG. 6) may be performed according to process 800.

In 810, a physiological signal relating to the subject may be detected by physiological signal monitor 150 as described in step 710.

In 820, a second weighting function may be determined based on a second FOV and the physiological signal. In some embodiments, the determination of the second weighting function may be performed by weighting function determination unit 520. In some embodiments, the second weighting function may include a plurality of second weighting values corresponding to different movement phases. The second weighting values may be in range from 0 to 1. The second weighting values may be in a range from 0 to 1. For example, if the subject moves dramatically during the tension phase, the second weighting values corresponding to the tension phase may be relatively small, such as approximate to or equal to 0; if the subject moves gently during the resting phase, the second weighting values corresponding to the resting phase may be relatively large, such as approximate to or equal to 1. In some embodiments, a plurality of second strobe windows may be generated based on the second weighting function as illustrated in FIG. 10B. In some embodiments, the second weighting function may be determined based on the physiological signal and the second FOV. For example, the center axis of a strobe window may be located at a moment when the movement rate or the movement amplitude of the subject is minimum. Specifically, the first weighting function and the second weighting function may share the same center axes of the strobe windows. As another example, the half-peak width of second strobe windows may be determined based on the second FOV. The larger the second FOV is, the greater the half-peak width of the second strobe windows may be. In some embodiments, the second FOV may be larger than the first FOV, such that the half-peak width of the second strobe windows may be greater than the half-peak width of the first strobe windows.

Referring back to FIG. 8, in 830, a second portion of the scan data may be extracted from the scan data (or the preprocessed scan data if the scan data have been preprocessed) based on the second weighting function. In some embodiments, the second portion of the scan data may be obtained by weighting function determination unit 520. The second portion of the scan data may be used for reconstructing an image corresponding to the second FOV. In some embodiments, the second portion of the scan data may be obtained by multiplying the second weighting function with the scan data. For example, the second portion of the scan data may include the scan to acquired by a scanning device (such as gantry 110 in FIG. 1) at a time when the weighting values are non-zero.

In 840, a second image may be reconstructed based on the second portion of the scan data. In some embodiments, the reconstruction of the second image may be performed by image generation unit 530. The second image may be reconstructed based on a reconstruction technique as described elsewhere in the disclosure. In some embodiments, the second image and the first image may be reconstructed in a same or different reconstruction technique.

It should be noted that the description of process 800 is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, the second portion of the scan data may be preprocessed before step 840 as illustrated in step 420.

Figure 9:
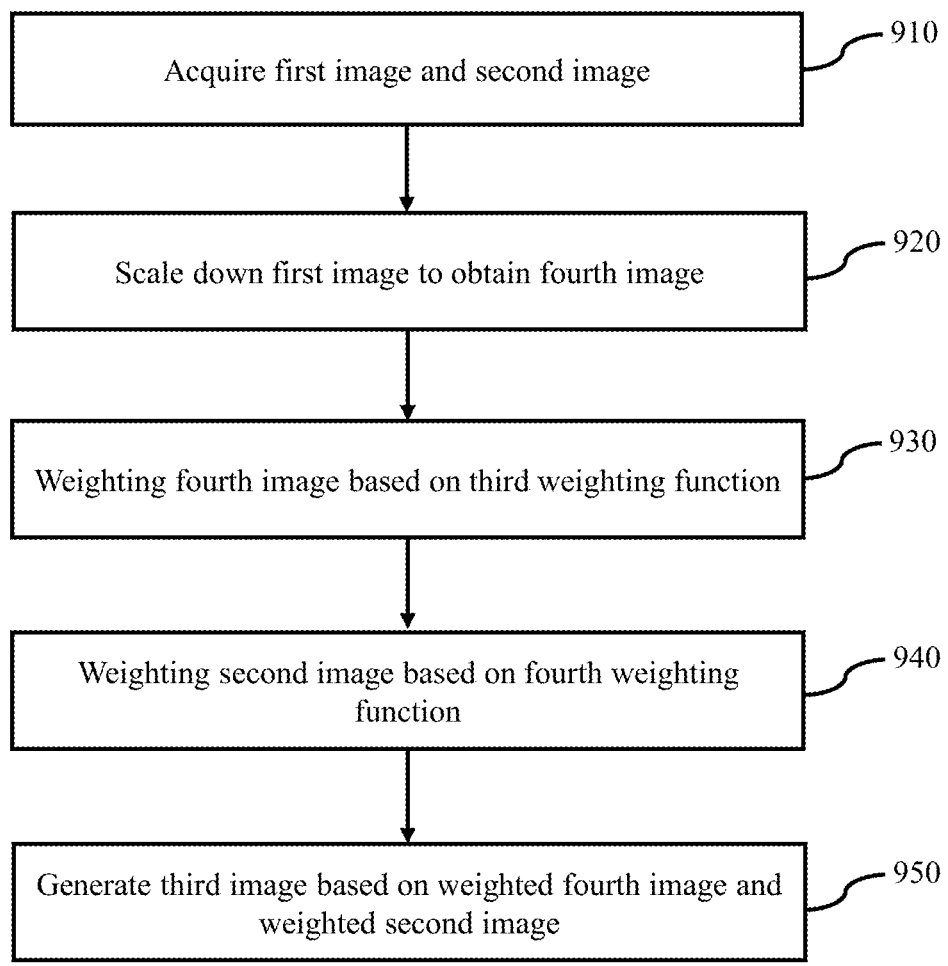
FIG. 9 is a flowchart illustrating an exemplary process for generating an image according to some embodiments of the present disclosure.

FIG. 9 is a flowchart illustrating an exemplary process for generating an image according to some embodiments of the present disclosure. In some embodiments, process 900 may be performed by image generation unit 530. In some embodiments, step 660 of process 600 illustrated in FIG. 6 may be performed according to process 900.

In 910, a first image and a second image may be acquired. In some embodiments, the first image and the second image may be acquired by image generation unit 530. In some embodiments, the first image may be reconstructed based on a first FOV according to process 700. The second image may be reconstructed based on a second FOV according to process 800. In some embodiments, the second FOV may include at least one portion of the first FOV. Merely by way of example, the first FOV and the second FOV may share at least some area. In some embodiments, the first FOV may be located within the second FOV. For example, the first FOV may be a region around the heart, while the second FOV may be a region around the lung, which may include the first FOV.

In 920, a fourth image may be obtained by scaling down the first image. In some embodiments, the first image may be scaled down by preprocessing module 320. In some embodiments, the first image and the second image may be in a same size or different sizes. As used herein, the size of an image may denote the dimensions of the image, such as length and width of the rectangular shape of the image. The first region presented in the first image may correspond to a second region presented in the second image. As used herein, the first region presented in the first image and the second region presented in the second image may correspond to a same physical location or spot of the subject. In some embodiments, the first image may be scaled down such that the first region in the first image may be adjusted to the same size of the corresponding portion of the second region in the second image. The first image may be scaled down based on an interpolation algorithm. The interpolation algorithm may include a neighbor interpolation algorithm, a bilinear interpolation algorithm, a bicubic interpolation algorithm, a supersampling anti-aliasing algorithm, a partial differential equations algorithm, a wavelet inverse interpolation algorithm, a fractal image interpolation algorithm, or the like, or a combination thereof.

In 930, the fourth image may be weighted based on a third weighting function. In some embodiments, step 930 may be performed by weighting function determination unit 520. The fourth image may include a first plurality of pixels. Each pixel may have a grey-level value. In some embodiments, the weighting process may be performed in a manner that at least some grey-level values in the fourth image may be multiplied with weighting values generated by the third weighting function. The weighting values corresponding to different pixels may be different. Merely by way of example, the fourth image may be classified into a first portion, a second portion, and a third portion. The first portion may be a first circle region with a first radius. The second portion may be an annulus region between the first circle and a second circle with a second radius. In some embodiments, the second circle may share a same center with the first circle. The third portion may be the region other than the first portion and the second portion. For illustration purpose, the weighting values corresponding to the pixels in the first portion may be a first constant value (e.g., a value within the range from 0 to 1). The weighting values corresponding to the pixels in the second portion may be variable values relating to the specific locations of the pixels in the second portion. For example, the weighting values may be determined based on a distance from a pixel in the second portion of the fourth image to the center of the first circle or the second circle. Specially, the weighting values may be linear relating to the distance. The greater the distance is, the smaller the weighting value corresponding to a pixel in the second portion of the fourth image may be. The weighting values corresponding to the pixels in the third portion may be a second constant value (e.g., a value within the range from 0 to 1). The first constant value may be same with or different to the second constant value.

In 940, the second image may be weighted based on a fourth weighting function. In some embodiments, step 930 may be performed by weighting function determination unit 520. In some embodiments, the fourth weighting function may be same with or different to the third weighting function. The second image may include a second plurality of pixels. Each pixel may have a grey-level value. In some embodiments, the weighting process may be performed in a manner that at least some grey-level values in the second image may be multiplied with weighting values generated by the fourth weighting function. The weighting values corresponding to different pixels may be different. Merely by way of example, the second image may be classified into a fourth portion, a fifth portion, and a sixth portion. The fourth portion may be a fourth circle region with the first radius. The fifth portion may be an annulus region between the fourth circle and a fifth circle with the second radius. In some embodiments, the fourth circle may share a same circle center with the fifth circle. The sixth portion may be the region other than the fifth portion and the fourth portion. For illustration purpose, the weighting values corresponding to the pixels in the fourth portion may be a third constant value (e.g., a value within the range from 0 to 1). The weighting values corresponding to the pixels in the fifth portion may be variable values relating to the specific locations of pixels in the fifth portion. For example, the values may be determined based on a distance from a pixel in the fifth portion of the second image to the center of the third circle or the fourth circle. Specially, the values may be linear relating to the distance. The greater the distance is, the greater the weighting value corresponding to a pixel in the fifth portion of the second image may be. The weighting values corresponding to pixels in the sixth portion may be a fourth constant value (e.g., a value within the range from 0 to 1). In some embodiments, the sum of the weighting value of a pixel in the fourth image and the weighting value of the corresponding pixel in the second image may be in a range from 0 to 1. In some embodiments, the first constant value may be same with or different to the fourth constant value. The second constant value may be same with or different to the third constant value.

In 950, a third image may be generated based on the weighted fourth image and the weighted second image. In some embodiments, the third image may be generated by image generation unit 530. In some embodiment, the image generation process may include performing an addition operation on the weighted fourth image with the weighted second image. For example, the addition operation may be performed in a manner that two grey-level values of two corresponding pixels from the two weighted image are added. As used herein, two corresponding pixels in the weighted fourth image and the weighted second image may correspond to a same physical location or spot of a subject represented in the image. In some embodiments, the weighted second image may include more pixels than the weighted fourth image.

It should be noted that the description of the imaging system is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, step 920 may be replaced with a different step in which instead of scaling down the first image, the second image may be scaled up such that the second region in the second image may be adjusted to the same size of the corresponding portion of the first portion in the first image. As another example, steps 930 and 940 may be performed synchronously (or simultaneously). In some embodiments, step 920 may be skipped if the size of first region in the first image is same with the corresponding portion of the second region in the second image.

FIG. 10A is an exemplary electrocardiogram (ECG) according to some embodiments of the present disclosure. As shown, the horizontal coordinate of the electrocardiogram (ECG) refers to the time (e.g., the scanning time), and the vertical coordinate of the electrocardiogram (ECG) refers to the heartbeat amplitude corresponding to the time. The ECG may reflect the changes in the heartbeat amplitude over the time. The ECG may include a plurality of cardiac cycles (e.g., a cardiac cycle T), each including at least one time interval with great heartbeat amplitude (e.g., a time interval $t_1$), also referred to tension phase, and at least one time interval with low heartbeat amplitude (e.g., a time interval $t_2$), also referred to resting phase.

FIG. 10B is an exemplary weighting function curve generated based on the ECG in FIG. 10A according to some embodiments of the present disclosure. As shown, the horizontal coordinate of the weight function curve refers to the time t, and the vertical coordinate of the weighting function curve refers to the weighting values corresponding to the time. In a cardiac cycle, the weighting values may be in a range from 0 to 1. The time with great heartbeat amplitude may be corresponding to a small weighting value (e.g., values represented in time interval "$z_1$") and the time with low heartbeat amplitude may be corresponding to a large weighting value (e.g., values represented in time interval "$z_2$").

For example, as shown in FIG. 10B, the large heartbeat amplitude in time interval $t_1$ may correspond to the weighting value 0, and the low heartbeat amplitude in time interval $t_2$ may correspond to the weighting value 1. The weight function curve with the weighting value 1 may form a plurality of strobe windows (e.g., strobe window 1010 and strobe window 1020) in an approximately rectangular shape. The strobe windows may be defined by a half-peak width W and a center axis represented by a dotted line in the figure.

In some embodiments, the weighting function curve may be determined based on a physiology signal (e.g., the ECG illustrated in FIG. 10A), an FOV, or the like, or a combination thereof. For example, the position of a strobe window may be determined based on the ECG. The center axis of the strobe window (e.g., one of the dotted lines illustrated in FIG. 10B) may be located at the time with the smallest heartbeat amplitude (e.g., one of the dotted lines illustrated in FIG. 10A). As another example, the half-peak width W of the strobe window may be determined based on the FOV. The larger the FOV is, the greater the half-peak width W of the strobe window may be; the smaller the FOV is, the narrower the half-peak width W of the strobe window may be.

In some embodiments, the weighting function may be determined based on other physical signals such as an electromyography (EMG) signal, an electroencephalogram (EEG) signal, a respiratory signal, a pulse signal, or the like, or a combination thereof. For example, the weighting function may be determined based on the respiratory signal if the scanning subject includes lung or abdomen.

Figure 11:
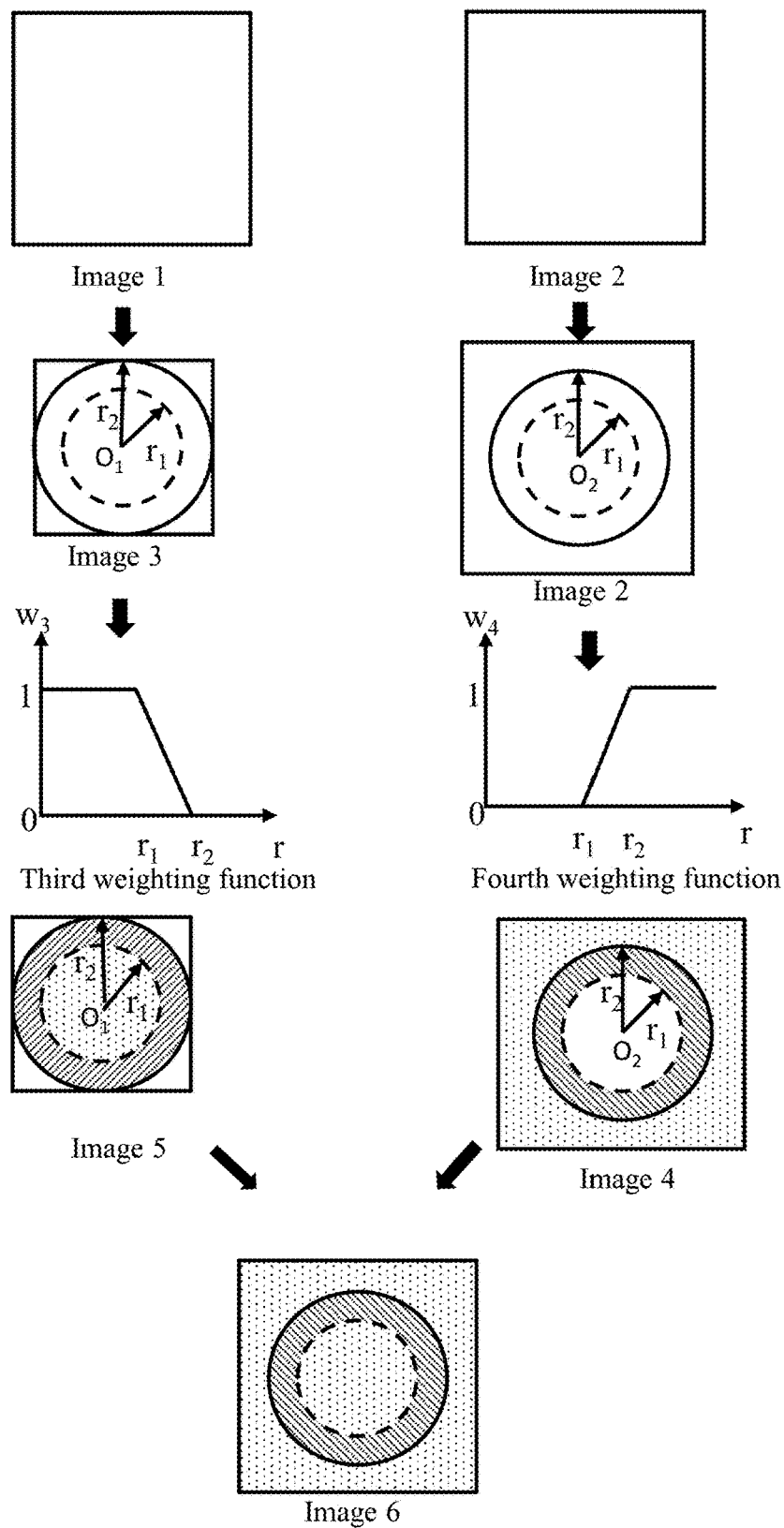
FIG. 11 includes diagrams illustrating an exemplary process for generating an image according to some embodiments of the present disclosure.

FIG. 11 includes diagrams illustrating an exemplary process for generating an image according to some embodiments of the present disclosure. Step 950 of process 900 may be performed according to process 1100. As shown, Image 1 may be reconstructed at a first FOV including a first plurality of pixels having a first plurality of grey-level values. Image 2 may be generated at a second FOV including a second plurality of pixels having a second plurality of grey-level values. In some embodiments, the first FOV may share a same center with the second FOV. The second FOV may include the first FOV, meaning that Image 2 may include the same object(s) presented in Image 1. In some embodiments, Image 1 and Image 2 may have a same size. At first, Image 1 may be scaled down to obtain Image 3 (i.e., the resized Image 1) such that two corresponding regions in Image 3 and Image 2 may be in a same size. As used herein, two corresponding regions in Image 2 and in Image 3 may refer to two regions in the two images that correspond to a same physical location or portion of a subject presented in Image 2 and Image 3.

A first circle with a radius $r_1$ may be determined in Image 3. The first circle may share a same center with Image 3 (e.g., the center point $O_1$). A second circle with the center point $O_1$ and a radius $r_2$ may be determined in Image 3. A third circle with the radius $r_1$ may be determined in Image 2. The third circle may share a same center with Image 2 (e.g., the center point $O_2$). A fourth circle with the center point $O_2$ and the radius $r_2$ may be determined in Image 3. The radius $r_2$ may be greater than the radius $r_1$. In some embodiments, the radius $r_2$ may be determined as large as possible. For example, in the case when Image 3 is a square with a side length $r_3$, the radius $r_2$ may be set to be $r_3$.

Image 5 may be obtained by performing a third weighting function on Image 3. The third weighting function may be performed to adjust the first plurality of grey-level values corresponding to the first plurality of pixels in Image 3. Image 4 may be obtained by performing a fourth weighting function on Image 2. The fourth weighting function may be performed to adjust the second plurality of grey-level values corresponding to the second plurality of pixels in Image 4.

In some embodiments, both the third weighting function and the fourth weighting function may be determined based on the radius $r_1$ and the radius $r_2$ in Image 3. The third weighting function $w_3(r)$ may be:

$$w_3(r) = \begin{cases} 1, r \leq r_1 \\ \frac{1}{r_1 - r_2}r + \frac{r_2}{r_2 - r_1}, r_1 < r < r_2, \\ 0, r \geq r_2 \end{cases}$$

wherein the radius r may refer to a distance from a pixel to the center point $O_1$ in Image 3. The weighting values determined in the third weighting function may vary according to the radius r. The weighting values of the third weighting function may multiply by the first plurality of grey-level values corresponding to the first plurality pixels in Image 3. For illustration purposes, if a radius r of one pixel in Image 3 is less than or equal to $r_1$, the grey-level value corresponding to the pixel may be multiplied by the weighting value 1; if a radius r of one pixel in Image 3 is in the range from $r_1$ to $r_2$, the grey-level value corresponding to the pixel may be multiplied by the weighting value $$\frac{1}{r_1 - r_2}r + \frac{r_2}{r_2 - r_1};$$

if a radius r of one pixel in Image 3 is greater than or equal to $r_2$, the grey-level value corresponding to the pixel may be multiplied with the weighting value 0.

The fourth weighting function $w_4(r')$ may be:

$$w_4(r') = \begin{cases} 0, r' \leq r_1 \\ \frac{1}{r_2 - r_1}r' + \frac{r_1}{r_1 - r_2}, r_1 < r' < r_2, \\ 1, r' \geq r_2 \end{cases}$$

wherein the radius r' may refer to a distance from a pixel to the center point $O_2$ in Image 2. The weighting values determined in the fourth weighting function may vary according to the radius r'. The weighting values of the fourth weighting function may be multiplied by the second plurality of grey-level values corresponding to the second plurality pixels in Image 2. For illustration purposes, if a radius r' of one pixel in Image 2 is less than or equal to $r_1$, the grey-level value corresponding to the pixel may be multiplied with the weighting value 0; if a radius r' of one pixel in Image 2 is in a range from $r_1$ to $r_2$, the grey-level value corresponding to the pixel may be multiplied by the weighting value $$\frac{1}{r_2 - r_1}r' + \frac{r_1}{r_1 - r_2};$$

if a radius r' of one pixel in Image 2 is greater than or equal to $r_2$, the grey-level value corresponding to the pixel may be multiplied by the weighting value 1.

Image 6 may be obtained by combining Image 4 and Image 5. The grey-level values of corresponding pixels in Image 5 and in Image 4 may be added together. As used herein, the corresponding pixels in Image 4 and Image 5 may refer to pixels in the two images that correspond to a same physical location or spot of a subject presented in Image 4 and Image 5.

It should be noted that the description of the image generation is provided for the purposes of illustration, and not intended to limit the scope of the present disclosure. For persons having ordinary skills in the art, various variations and modifications may be conduct under the teaching of the present disclosure. However, those variations and modifications may not depart from the protecting of the present disclosure. For example, the first circle region and the second circle region may be determined before scaling down Image 1. In some embodiments, the sizes of two corresponding regions in Image 1 and in Image 2 may be equal by scaling up the size of Image 2. In some embodiments, Image 4 and Image 5 may be unnecessary and Image 6 may be obtained by combining weighted Image 3 and weighted Image 2.

Figure 12A:
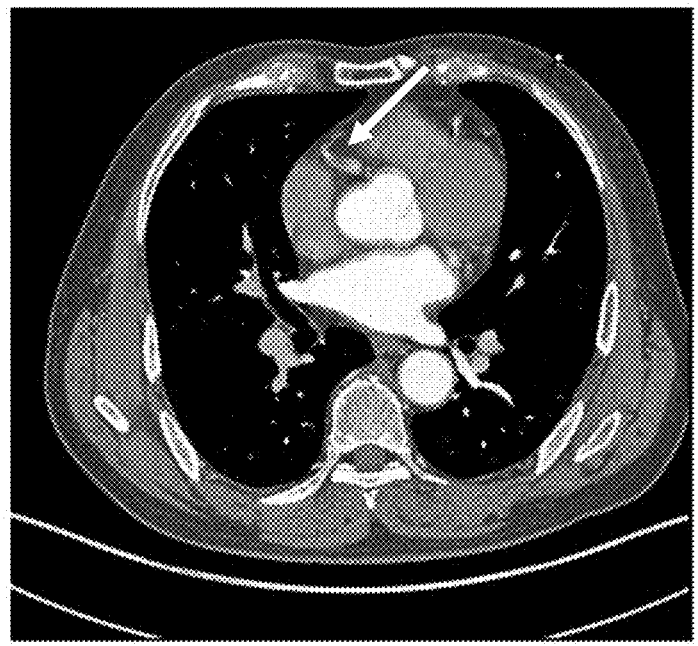
FIG. 12A is an exemplary first image of a subject reconstructed in a first FOV according to some embodiments of the present disclosure.

FIG. 12A is an exemplary first image of a subject reconstructed in a first FOV according to some embodiments of the present disclosure. The first FOV includes a reconstruction range of a square with side length 350 mm. As shown, the tissues presented in the center region of the first image identified by an arrow may be breezing.

Figure 12B:
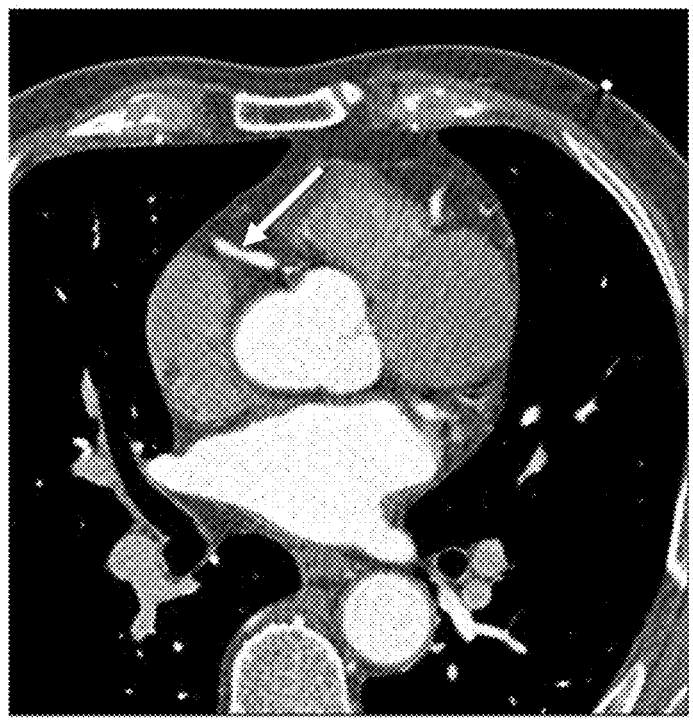
FIG. 12B is an exemplary second image of the same subject as presented in FIG. 12A reconstructed in a second FOV according to some embodiments of the present disclosure.

FIG. 12B is an exemplary second image of the same subject as presented in FIG. 12A reconstructed in a second FOV according to some embodiments of the present disclosure. As shown, the second image in the second FOV may present a magnified center portion of the first image as shown in FIG. 12A, while exclude the edge region of the first image. The second FOV includes a reconstruction range of a square with side length 200 mm. As shown, the tissue presented in the center region of the second image identified by an arrow may be clearer than the same tissues presented in the first image as shown in FIG. 12A.

Figure 12C:
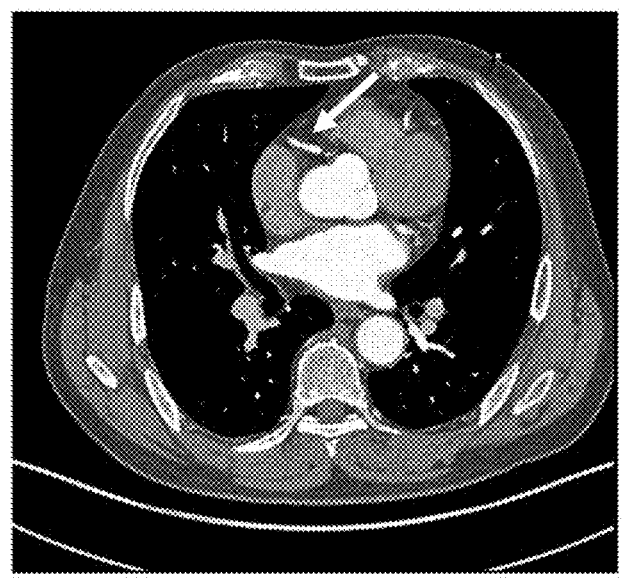
FIG. 12C is an exemplary third image of the subject determined based on the first image as shown in FIG. 12A and the second image as shown in FIG. 12B according to some embodiments of the present disclosure.

FIG. 12C is an exemplary third image of the subject determined based on the first image as shown in FIG. 12A and the second image as shown in FIG. 12B according to some embodiments of the present disclosure. The third image is generated based on the first image as shown in FIG. 12A and the second image as shown in FIG. 12B according to the present disclosure. The tissues presented in the center region of the third image identified by an arrow may be clearer than the same tissues presented in the first image as shown in FIG. 12A, and the third image also includes the edge region of the first image.

It should be noted that the above description of the embodiments are provided for the purposes of comprehending the present disclosure, and not intended to limit the scope of the present disclosure. For persons having ordinary skills in the art, various variations and modifications may be conducted in the light of the present disclosure. However, those variations and the modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including a subject oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on a medical imaging device having at least one processor, a storage medium and a communication platform connected to a network, the method comprising:
    obtaining scanning data relating to a subject, the scanning data being generated upon radiation that is produced by an X-ray source according to a single scan;
    extracting a first portion of scan data from the scanning data;
    extracting a second portion of scan data from the scanning data;
    reconstructing a first image based on the first portion of the scan data, the first image representing a first region of the subject in a first field of view (FOV);
    reconstructing a second image based on the second portion of the scan data, the second image representing a second region of the subject in a second FOV, the second FOV being larger than the first FOV, the second region of the subject including the first region of the subject, and the second image having a lower resolution than that of the first image;
    generating, based on a combination of the first image and the second image, a third image.

2. The method of claim 1, further comprising:
    detecting a physiological signal of the subject, wherein:
    reconstructing a first image based on the first portion of the scan data comprises:
        extracting the first portion of the scan data from the scanning data based on the physiological signal; and
    reconstructing a second image based on the second portion of the scan data comprises:
        extracting the second portion of the scan data from the scanning data based on the physiological signal.

3. The method of claim 2, wherein the physiological signal of the subject includes an electrocardiogram signal or a respiration signal of the subject.

4. The method of claim 2, wherein extracting the first portion of the scan data from the scanning data based on the physiological signal comprises:
    determining a first weighting function associated with the first FOV;
    extracting the first portion of the scan data from the scanning data based on the physiological signal and the first weighting function associated with the first FOV.

5. The method of claim 4, wherein extracting the second portion of the scan data from the scanning data based on the physiological signal comprises:
    determining a second weighting function associated with the second FOV;
    extracting the second portion of the scan data from the scanning data based on the physiological signal and the second weighting function associated with the second FOV.

6. The method of claim 5, wherein the first weighting function is represented by at least one first strobe window, and the second weighting function is represented by at least one second strobe window, wherein a half-peak width of the at least one second strobe window is greater than a half-peak width of the at least one first strobe window.

7. The method of claim 6, wherein a center axis of the at least one first strobe window is located at a moment when a movement amplitude of the subject indicated by the physiological signal is minimum.

8. The method of claim 1, wherein generating, based on a combination of the first image and the second image, a third image comprises:
   weighting the first image based on comparing a first radial distance of a pixel in the first image with a first radius of a first circular portion in the first image and a second radius of a second circular portion in the first image, and
   weighting the second image based on comparing a second radial distance of a pixel in the second image with the first radius and the second radius, wherein
   the first circular portion and the second circular portion co-center in the first image and the second radius is greater than the first radius.

9. The method of claim 8, further comprising:
   resizing the first image by scaling down the first image, wherein the generating the third image is based on the resized first image.

10. The method of claim 8, wherein weighting the first image based on comparing a first radial distance of a pixel in the first image with a first radius of a first circular portion in the first image and a second radius of a second circular portion in the first image comprises:
    setting a weight of the first image as a first constant value if the first radial distance is less than or equal to the first radius,
    setting the weight of the first image as a first variable value if the first radial distance is greater than the first radius and less than the second radius, and
    setting the weight of the first image as a second constant value if the first radial distance is greater than or equal to the second radius, the second constant value being smaller than the first constant value.

11. The method of claim 8, wherein weighting the second image based on comparing a second radial distance of a pixel in the second image with the first radius and the second radius comprises:
    setting a weight of the second image as a third constant value if the second radial distance is less than or equal with the first radius,
    setting the weight of the second image as a first variable value if the second radial distance is greater than the first radius and less than the second radius, and
    setting the weight of the second image as a fourth constant value if the second radial distance is greater than or equal to the second radius, the fourth constant value being greater than the third constant value.

12. The method of claim 1, furthering comprising:
    displaying at least the third image on a graphical user interface (GUI).

13. A medical imaging system having at least one processor, a non-transitory storage medium storing a set of instructions and a communication platform connected to a network, wherein when executing the set of instructions, the at least one processor causes the system to perform operations including:
    obtaining scanning data relating to a subject, the scanning data being generated upon radiation that is produced by an X-ray source according to a single scan;
    extracting a first portion of the scan data from the scanning data;
    extracting a second portion of the scan data from the scanning data;
    reconstructing a first image based on the first portion of the scan data, the first image representing a first region of the subject in a first field of view (FOV);
    reconstructing a second image based on the second portion of the scan data, the second image representing a second region of the subject in a second FOV, the second FOV being larger than the first FOV, the second region of the subject including the first region of the subject, and the second image having a lower resolution than that of the first image;
    generating, based on a combination of the first image and the second image, a third image.

14. The medical imaging system of claim 13, wherein the at least one processor causes the system to perform operations further including:
    detecting a physiological signal of the subject, wherein:
       reconstructing a first image based on the first portion of the scan data comprises:
          extracting the first portion of the scan data from the scanning data based on the physiological signal; and
       reconstructing a second image based on the second portion of the scan data comprises:
          extracting the second portion of the scan data from the scanning data based on the physiological signal.

15. The method of claim 14, wherein the physiological signal of the subject includes an electrocardiogram signal or a respiration signal of the subject.

16. The method of claim 14, wherein extracting the first portion of the scan data from the scanning data based on the physiological signal comprises:
    determining a first weighting function associated with the first FOV;
    extracting the first portion of the scan data from the scanning data based on the physiological signal and the first weighting function associated with the first FOV.

17. The method of claim 16, wherein extracting the second portion of the scan data from the scanning data based on the physiological signal comprises:
    determining a second weighting function associated with the second FOV;
    extracting the second portion of the scan data from the scanning data based on the physiological signal and the second weighting function associated with the second FOV.

18. A non-transitory computer readable medium storing instructions, the instructions, when executed by a computer, causing the computer to implement a method, comprising:
    obtaining scanning data relating to a subject, the scanning data being generated upon radiation that is produced by an X-ray source according to a single scan;
    extracting a first portion of the scan data from the scanning data;
    extracting a second portion of the scan data from the scanning data;
    reconstructing a first image based on the first portion of the scan data, the first image representing a first region of the subject in a first field of view (FOV);
    reconstructing a second image based on the second portion of the scan data, the second image representing a second region of the subject in a second FOV, the second FOV being larger than the first FOV, the second region of the subject including the first region of the subject, and the second image having a lower resolution than that of the first image;

generating, based on a combination of the first image and the second image, a third image.

* * * * *